United States Patent
Chen et al.

(10) Patent No.: US 8,090,490 B2
(45) Date of Patent: Jan. 3, 2012

(54) AUTOMATIC RECOVERY AND TRANSPORT SYSTEM AND EXECUTION METHOD THEREFOR

(75) Inventors: Yu-Kun Chen, Taipei County (TW); Chin-Hsiao Chuang, Taipei (TW)

(73) Assignee: Inotera Memories, Inc., Taoyuan County (TW)

( * ) Notice: Subject to any disclaimer, the term of this patent is extended or adjusted under 35 U.S.C. 154(b) by 439 days.

(21) Appl. No.: 12/390,674

(22) Filed: Feb. 23, 2009

(65) Prior Publication Data

US 2010/0087968 A1 Apr. 8, 2010

(30) Foreign Application Priority Data

Oct. 3, 2008 (TW) ................... 97138147 A

(51) Int. Cl.
*G01M 17/00* (2006.01)
*E01F 1/00* (2006.01)
*B61K 1/00* (2006.01)
(52) U.S. Cl. ............. 701/24; 104/88.01; 246/169 R
(58) Field of Classification Search ........ 701/88.01, 701/88.02, 88.05, 24, 25, 29, 33; 104/24, 104/25, 29, 33, 88.01, 88.02, 88.05; 246/169 R
See application file for complete search history.

(56) References Cited

U.S. PATENT DOCUMENTS

| | | | |
|---|---|---|---|
| 7,427,865 B2 * | 9/2008 | Elder et al. | 324/511 |
| 7,600,478 B2 * | 10/2009 | Shimamura et al. | 104/88.04 |
| 7,620,470 B1 * | 11/2009 | Hickey et al. | 700/100 |
| 7,620,486 B2 * | 11/2009 | Ward et al. | 701/51 |
| 2005/0159854 A1 * | 7/2005 | Hori et al. | 701/1 |
| 2006/0230975 A1 * | 10/2006 | Shiwaku | 104/88.01 |
| 2007/0027615 A1 * | 2/2007 | Nagasawa | 701/200 |
| 2007/0163461 A1 * | 7/2007 | Shiwaku | 104/89 |

* cited by examiner

*Primary Examiner* — Sarah B McPartlin
(74) *Attorney, Agent, or Firm* — Rosenberg, Klein & Lee

(57) ABSTRACT

An automatic recovery and transport system includes a manufacture execution system, a path planning system electrically connected with the manufacture execution system, a vehicle control system electrically connected with the path planning system, a plurality of vehicles electrically connected with the vehicle control system; and an alarm system electrically connected with the path planning system and the vehicle control system. The alarm system will command the path planning system to command the vehicle control system to drive the vehicle about to stop to enter the maintenance area immediately. Accordingly, the stability and the work efficiency of the whole system are improved. The present invention also provides a method for executing an automatic recovery and transport system.

8 Claims, 6 Drawing Sheets

AUTOMATIC RECOVERY AND TRANSPORT SYSTEM AND EXECUTION METHOD THEREFOR

BACKGROUND OF THE INVENTION

1. Field of the Invention

The present invention relates to a transport system and execution method therefor in wafer factories, and more particularly to a transport system with an alarm function and execution method therefor.

2. Description of Related Art

Wafer cassette transport in wafer factories is executed by an automatic overhead track transport system. The transport system includes overhead tracks and a plurality of vehicles sliding on the overhead tracks. The wafer factories have a plurality of machine stations, a plurality of wafer cassette storage areas and a plurality of wafer cassette storage platforms located below the plurality of overhead tracks. The vehicles are used for transporting wafer cassettes between the wafer cassette storage areas.

Since the transport systems operate for 24 hours, the hardware devices in the transport systems, for example, sliding mechanisms, detectors, or chargeable batteries, are easy to have faults in the long operation. When the hardware devices have faults and cannot go on working, the vehicles immediately stop on the overhead tracks. So engineers must immediately repair the hardware devices to normal so that the vehicles can go on running on the overhead tracks, which causes that the stability of the whole system is low and the inactive vehicles affect the transport rate of other vehicles thereby reducing work efficiency of the whole system Hence, the inventors of the present invention believe that the shortcomings described above are able to be improved and finally suggest the present invention which is of a reasonable design and is an effective improvement based on deep research and thought.

SUMMARY OF THE INVENTION

A main object of the present invention is to provide an automatic recovery and transport system and execution method therefore which can improve stability and work efficiency of the whole system.

To achieve the above-mentioned object, an automatic recovery and transport system in accordance with the present invention is provided. The automatic recovery and transport system is built in a wafer factory which has a maintenance area and includes a manufacture execution system; a path planning system electrically connected with the manufacture execution system; a vehicle control system electrically connected with the path planning system; a plurality of vehicles electrically connected with the vehicle control system; and an alarm system electrically connected with the path planning system and the vehicle control system for recording times of abnormal states of each vehicle and setting the maximum bearing number, wherein when the times of the abnormal states of one of the vehicles reach the maximum bearing number, the alarm system commands the path planning system to command the vehicle control system to drive the vehicle of which the times of the abnormal states reach the maximum bearing number to enter the maintenance area.

The present invention also provides a method for executing an automatic recovery and transport system which is built in a wafer factory having a maintenance area and includes a vehicle control system and a plurality of vehicles. The method includes the steps of: (a). recording times of abnormal states of each vehicle by an alarm system; (b). setting the most bearing number corresponding to the times of the abnormal states by the alarm system; (c). the alarm system immediately sending a command to inform a path planning system when the times of the abnormal states of any vehicle reach the most bearing number, wherein the command contains that the vehicle of which the times of the abnormal states reach the most bearing number must be moved into the maintenance area for repair; (d). the path planning system planning the shortest path along which the vehicle can move into the maintenance area and commanding the vehicle control system to drive the vehicle to move into the maintenance area along the planned path according to the command of the alarm system; and (e). the alarm system commanding the path planning system to command the vehicle control system to drive the repaired vehicle to depart from the maintenance area when the vehicle is repaired to normal.

The efficacy of the present invention is as follows: the alarm system commands the vehicles about to stop running to move into the maintenance area of the wafer factory for repair before the vehicles stop running. Because the vehicles won't suddenly stop on the overhead tracks, so the whole system has high stability and the transport speed isn't affected, thereby the work efficiency is improved.

DETAILED DESCRIPTION OF PREFERRED EMBODIMENTS

Figure 1:
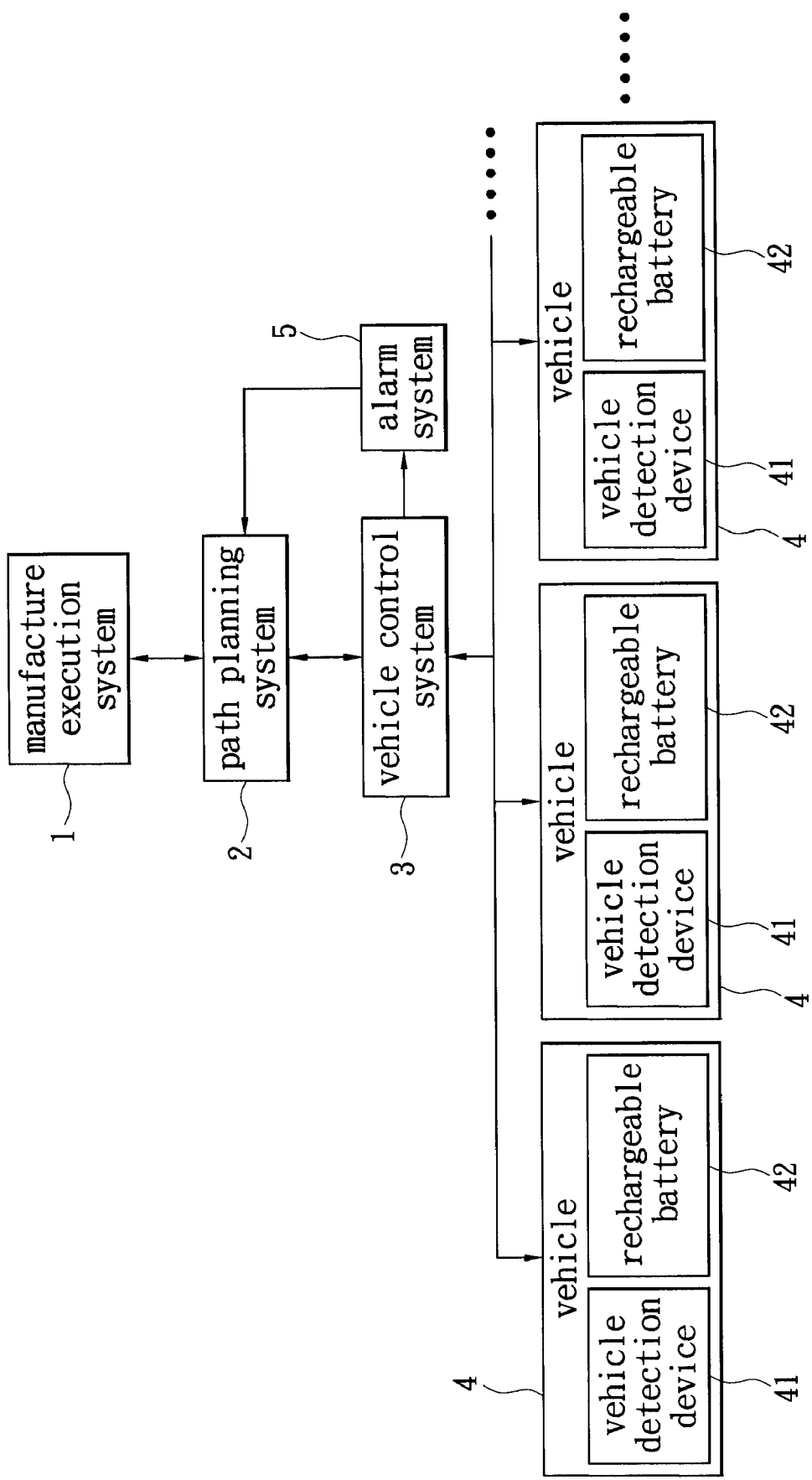
FIG. 1 is a block diagram of an automatic recovery and transport system of the present invention.

As shown in FIG. 1, the present invention provides an automatic recovery and transport system built in a wafer factory. The automatic recovery and transport system includes a manufacture execution system 1, a path planning system 2, a vehicle control system 3, a plurality of vehicles 4 and an alarm system 5. The path planning system 2 is electrically connected with the manufacture execution system 1 and the vehicle control system 3, and the signal transmission between the path planning system 2 and the manufacture execution system 1 and the vehicle control system 3 is two-way transmission. The vehicles 4 are electrically connected with the vehicle control system 3, and the signal transmission between the vehicles 4 and the vehicle control system 3 also is two-way transmission. The alarm system 5 is electrically connected with the path planning system 2 and the vehicle control system 3, and the signal transmission between the alarm system 5 and the path planning system 2 and the vehicle control system 3 is one-way transmission. The vehicles 4 of the automatic recovery and transport system are one kind of transport tools sliding on overhead tracks and each vehicle 4 has a vehicle detection device 41 and a rechargeable battery 42 mounted thereon.

Figure 2:
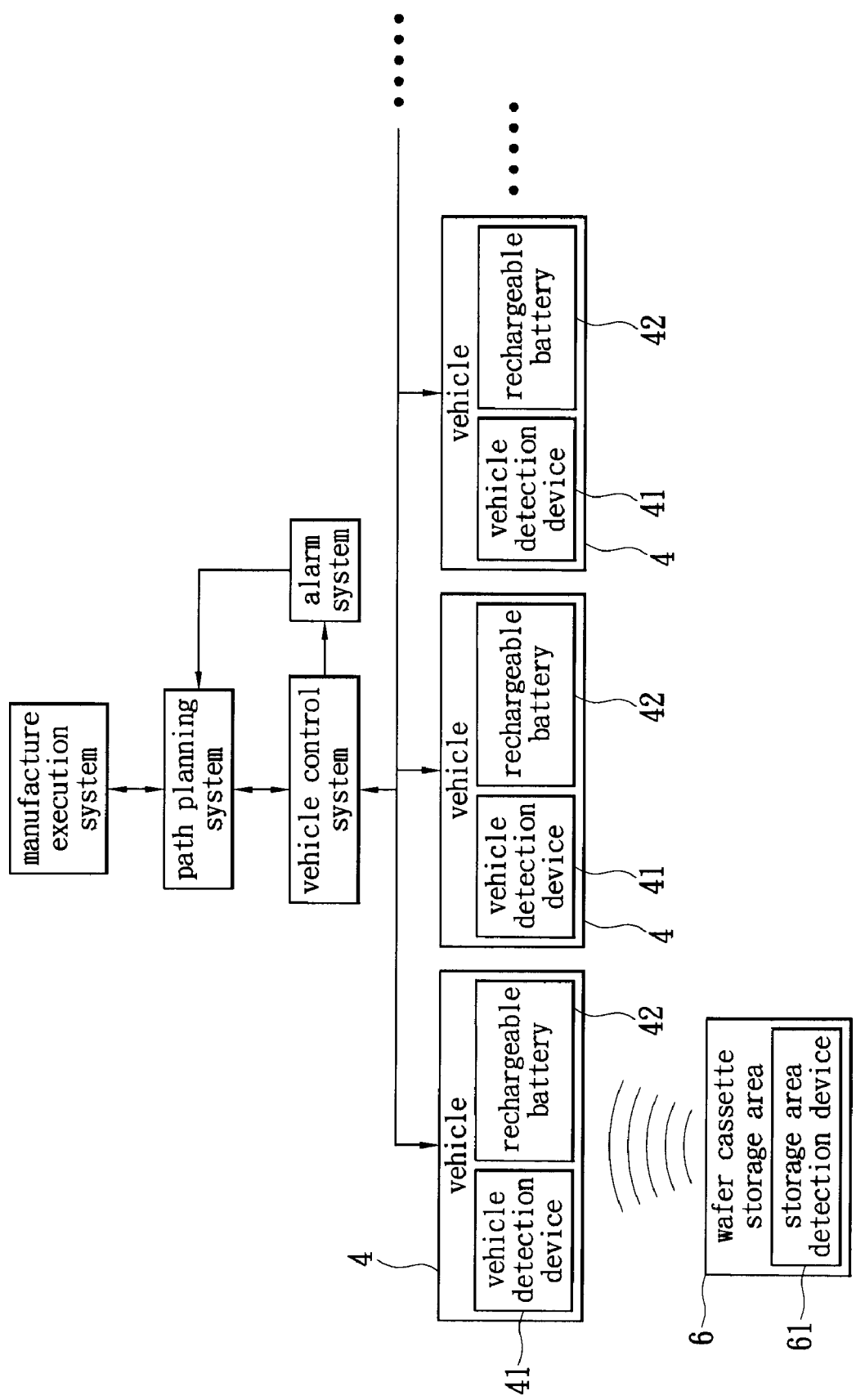
FIG. 2 is a block diagram of a second embodiment of the automatic recovery and transport system of the present invention.

The wafer factory has a plurality of machine stations and a maintenance area, and each machine station has a wafer cassette storage area 6 (as shown in FIG. 2). The manufacture execution system 1 is used for determining which wafer cassette storage areas 6 wafer cassettes are transported in and commanding the path planning system 2 to execute. The path planning system 2 plans the shortest transport path and commands the vehicle control system 3 to drive the vehicles 4 to transport the wafer cassettes according to the command of the manufacture execution system 1. When the hardware devices of each vehicle 4, for example, the vehicle detection device 41 and the rechargeable battery 42, produce abnormal states for many times, they will retest continuously till detaching from the abnormal states. However, if the hardware devices of one vehicle 4 produce abnormal states for too many times, then it is anticipated that the hardware devices of the vehicle 4 cannot be used soon so that the vehicle 4 will soon stop on the overhead track. Accordingly, the alarm system 5 must record the times of the abnormal states of each vehicle 4 and set the maximum bearing number. Once the times of the abnormal states reach the maximum bearing number, the alarm system 5 commands the path planning system 2 to command the vehicle control system 3 to drive the vehicle 4 about to stop running to enter the maintenance area for repair.

As shown in FIG. 2, each of the wafer cassette storage areas 6 has a storage area detection device 61 mounted therein, which is used for detecting whether there is a wafer cassette disposed in the wafer cassette storage area 6. The vehicle detection devices 41 are used for detecting whether the storage area detection devices 61 have faults and informing the alarm system 5 when some storage area detection devices 61 have faults so that the alarm system 5 immediately sends an email to engineers for real-time processing.

Figure 3:
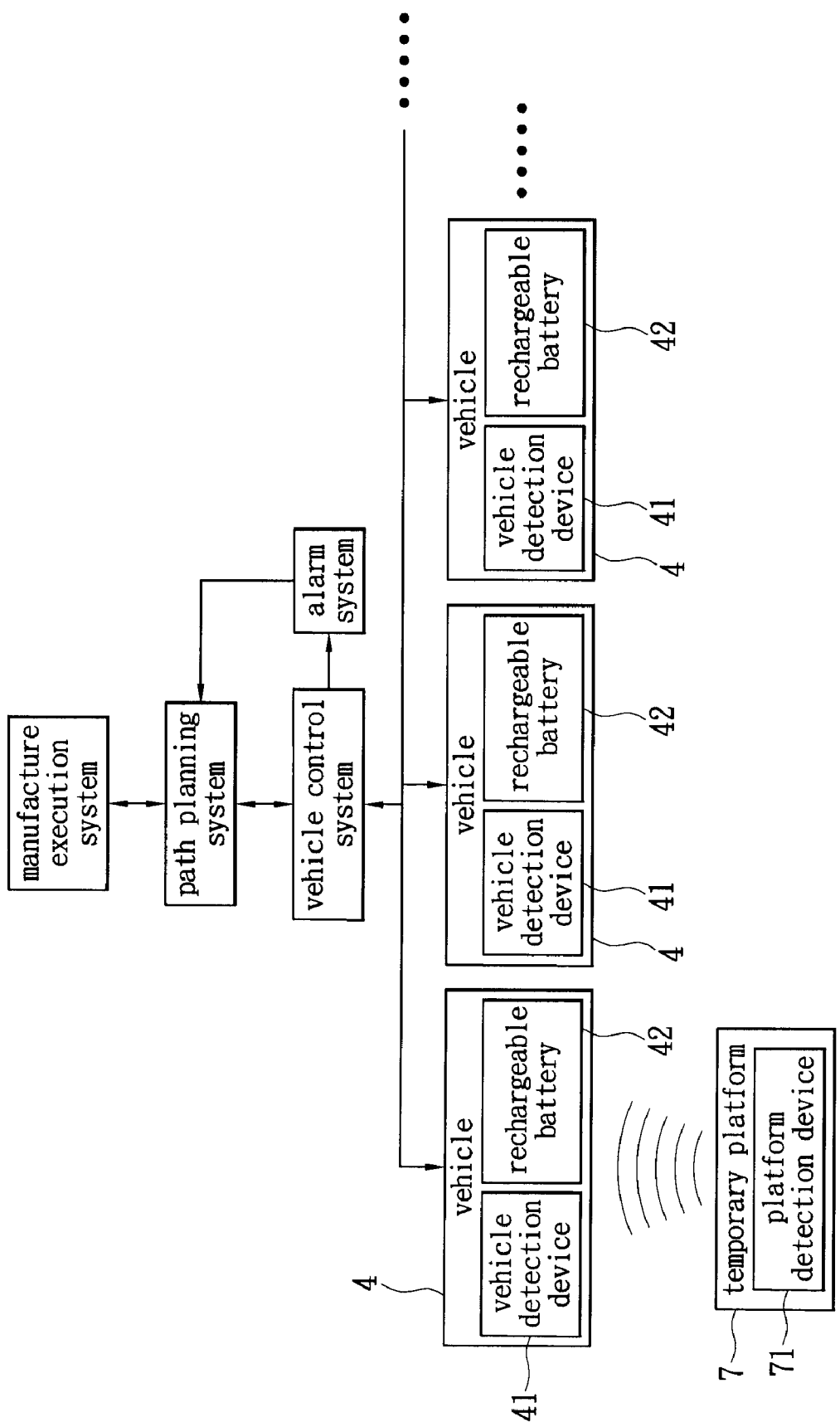
FIG. 3 is a block diagram of a third embodiment of the automatic recovery and transport system of the present invention.

As shown in FIG. 3, the automatic recovery and transport system further includes a plurality of temporary platforms 7 which each has a platform detection device 71 mounted thereon. The platform detection devices 71 are used for detecting whether there are wafer cassettes disposed on the temporary platforms 7. The vehicle detection devices 41 are used for detecting whether the platform detection devices 71 have faults. When some platform detection devices 71 have faults, the alarm system 5 is informed, so that the alarm system 5 immediately sends email to engineers for real-time processing.

Figure 4:
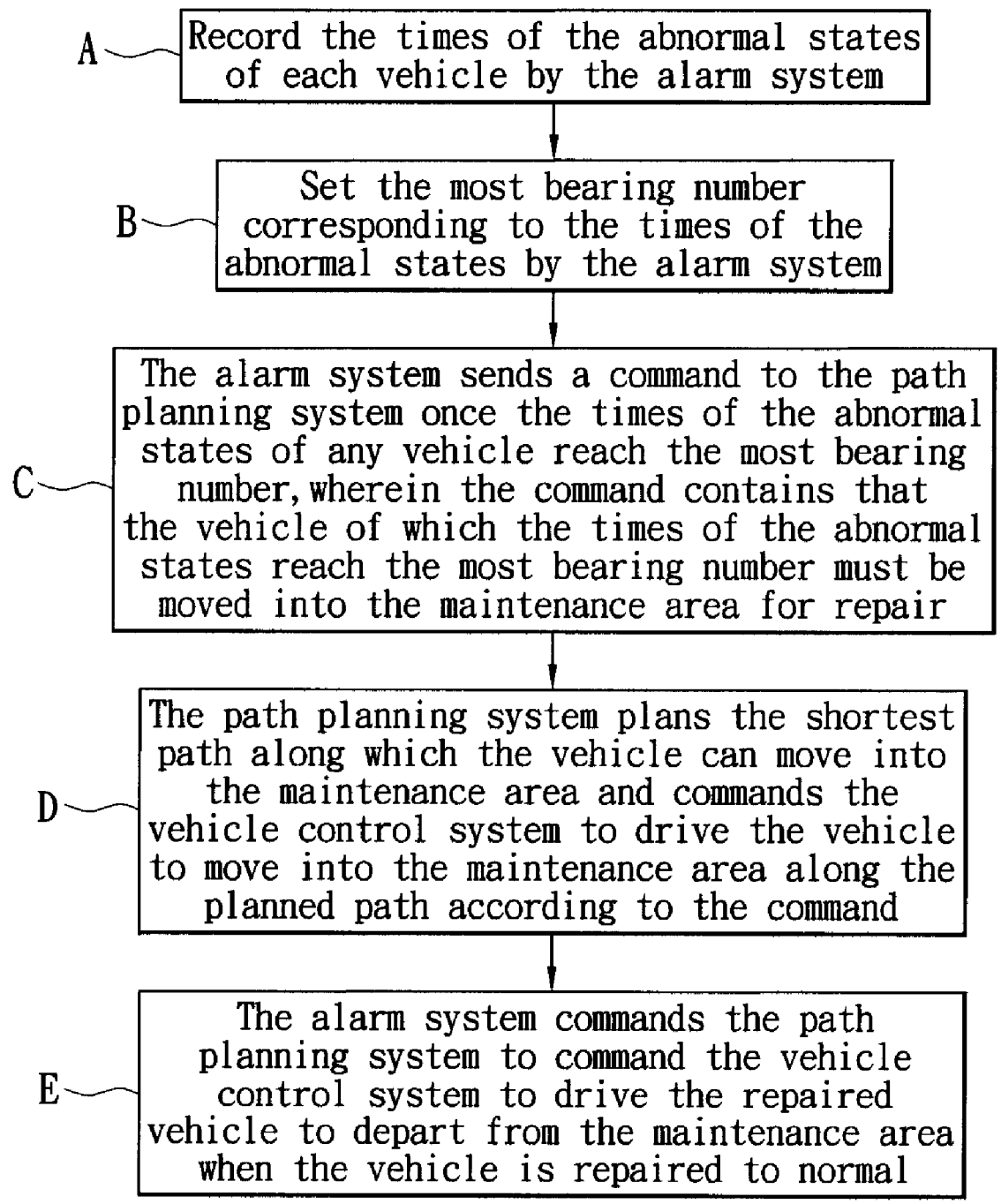
FIG. 4 is a flow chart of a method for executing an automatic recovery and transport system of the present invention.

As shown in FIG. 4, the present invention further provides a method for executing an automatic recovery and transport system which includes the steps of:

(a) informing the alarm system 5 via the vehicle control system 3 when each vehicle 4 produces any abnormal state and recording the times of the abnormal states of each vehicle 4 by the alarm system 5;

(b) setting the most bearing number corresponding to each kind of abnormal state by the alarm system 5;

(c) the alarm system 6 immediately sending a command to the path planning system 2 once the times of the abnormal states of any vehicle 4 reach the most bearing number, wherein the command contains that the vehicle 4 of which the times of the abnormal states reach the most bearing number must be moved into the maintenance area for repair;

(d). the path planning system 2 planning the shortest path along which the vehicle 4 can move into the maintenance area and commanding the vehicle control system 3 to drive the vehicle 4 to move into the maintenance area along the planned path according to the command; and (e). the alarm system 5 commanding the path planning system 2 to command the vehicle control system 3 to drive the repaired vehicle 4 to depart from the maintenance area and enter the overhead track when the vehicle 4 is repaired to normal.

There are various abnormal states in step (a), for example, when signal transmission delay occurs between one vehicle 4 and the vehicle control system 3, the vehicle detection device 41 cannot detect the conditions in front of the vehicle 4; or the rechargeable battery 42 of one vehicle 4 always isn't charged and stays in a state of 20% power for more than ten minutes.

Figure 5:
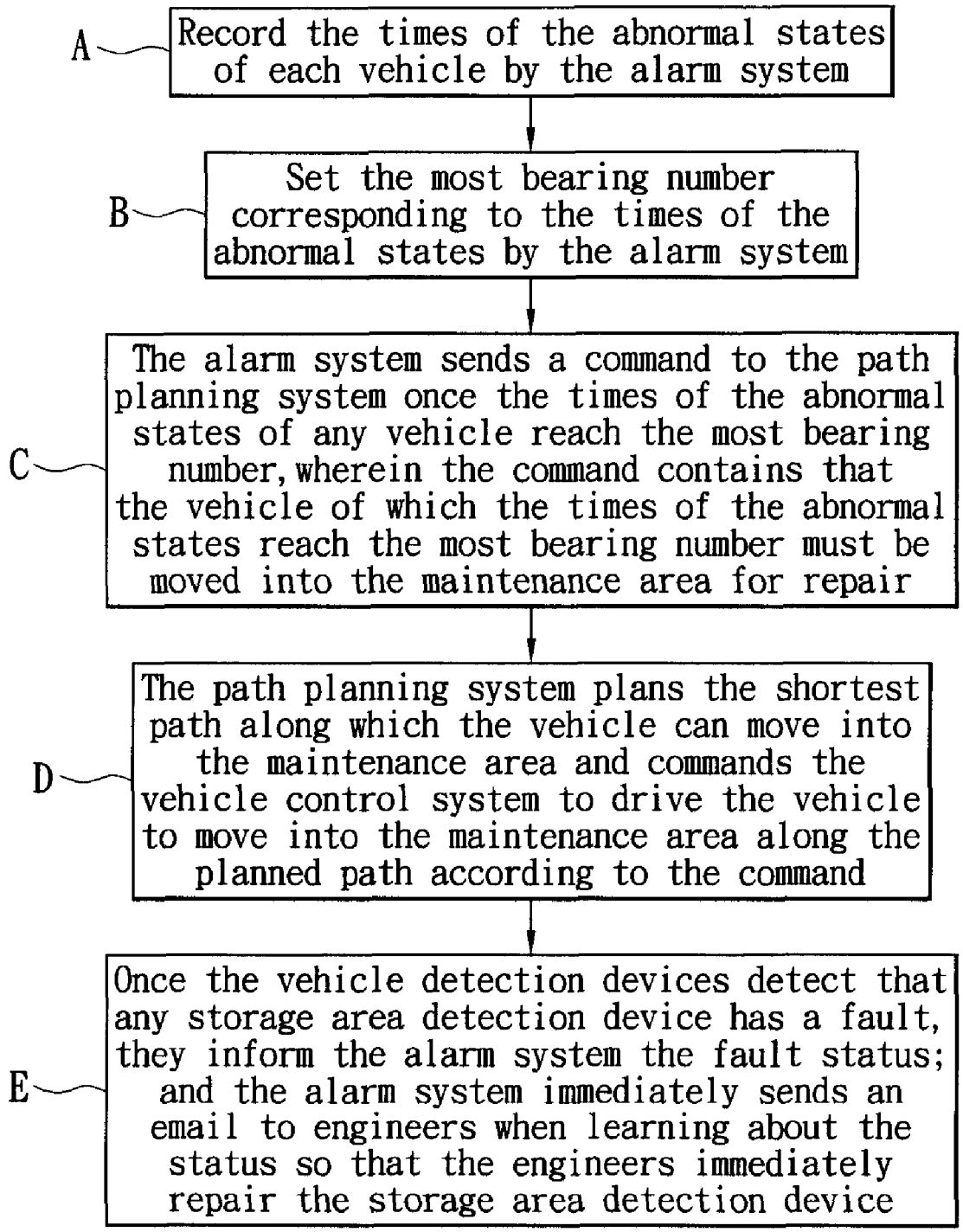
FIG. 5 is a flow chart of a second embodiment of the method for executing an automatic recovery and transport system of the present invention.

As shown in FIG. 5, when the storage area detection devices 61 have faults, the vehicles 4 are possible to move into the wafer cassette storage areas 6 and find that the corresponding wafer cassette storage areas 6 cannot receive the wafer cassettes only when desire to put down the wafer cassettes, which causes that the transport process is invalid and time is wasted. So once the vehicle detection devices 41 detect that any storage area detection device 61 has a fault, they inform the alarm system 5 the information that the storage area detection device 61 has a fault via the vehicle control system 3. When receiving the information, the alarm system 5 immediately sends an email to the engineers in the factory so that the engineers learn about which one of the storage area detection devices 61 has a fault and have a real-time treatment on the storage area detection device 61 with a fault.

Figure 6:
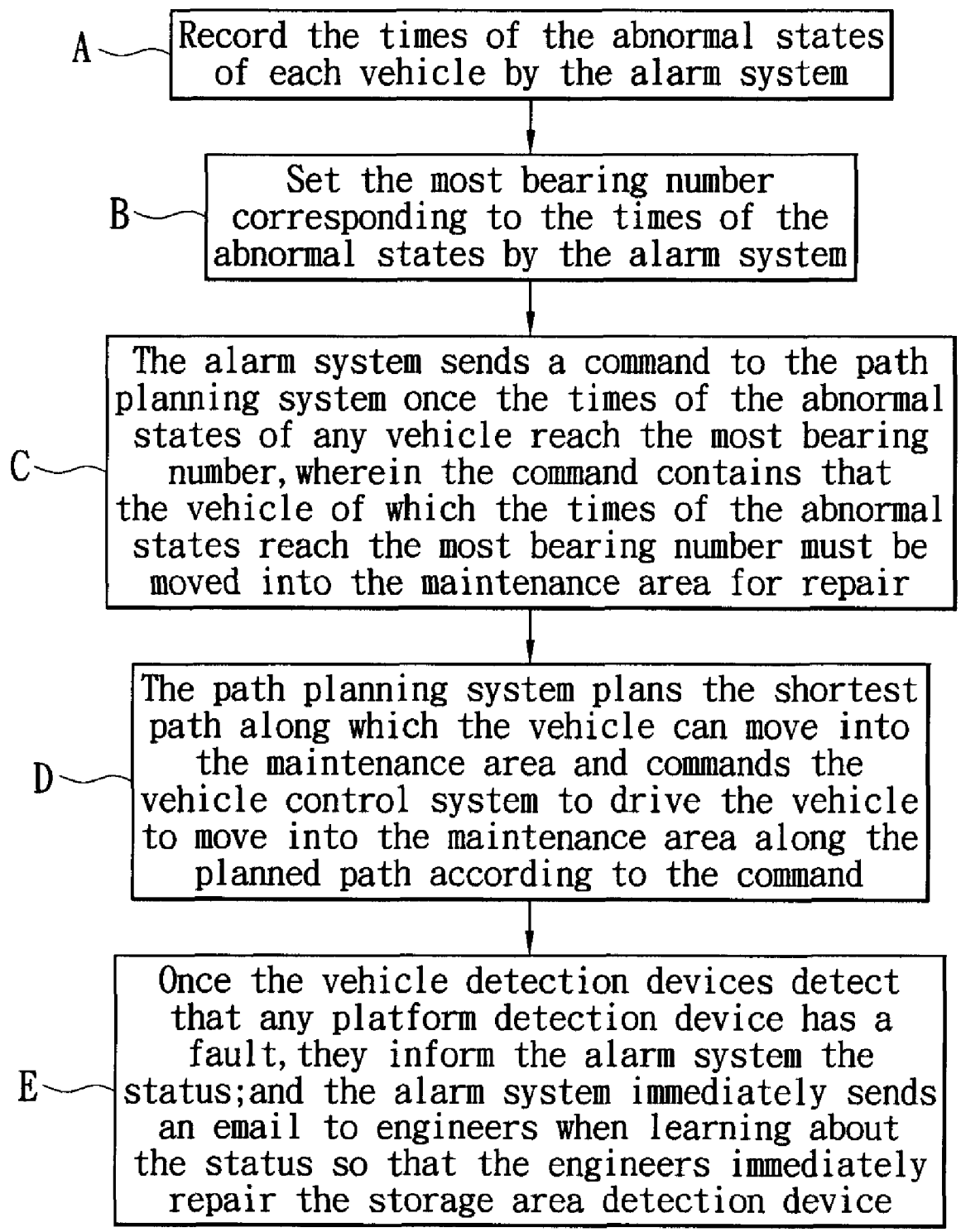
FIG. 6 is a flow chart of a third embodiment of the method for executing an automatic recovery and transport system of the present invention.

As shown in FIG. 6, when the vehicle detection devices 41 detect that any platform detection device 71 has a fault, they inform the alarm system 5 the information that the platform detection device 71 has a fault via the vehicle control system 3. When receiving the information, the alarm system 5 immediately sends an email to the engineers in the factory so that the engineers learn about which one of the storage area detection devices 61 has a fault and have a real-time treatment on the storage area detection device 61 with a fault.

Consequently, the automatic recovery and transport system and execution method therefore of the present invention has the advantages as follows:

1. The alarm system 5 commands the vehicles about to stop running to move into the maintenance area of the wafer factory for repair before the vehicles stop running. Because the vehicles won't suddenly stop on the overhead tracks, so the whole system has high stability and the transport speed isn't affected, thereby the work efficiency is improved.

2. When informed that the storage area detection devices 61 have faults or the platform detection devices 71 have faults, the alarm system 5 sends an email to the engineers in the factory so that the engineers can have a real-time treatment on the storage area detection devices 61 or the platform detection devices 71, thereby avoiding that invalid transport conditions occur and time is wasted.

What are disclosed above are only the specification and the drawings of the preferred embodiments of the present invention and it is therefore not intended that the present invention be limited to the particular embodiments disclosed. It will be understood by those skilled in the art that various equivalent changes may be made depending on the specification and the drawings of the present invention without departing from the scope of the present invention.

What is claimed is:

1. An automatic recovery and transport system built in a wafer factory which has a maintenance area and a plurality of wafer cassette storage areas, comprising:
   a manufacture execution system;
   a path planning system, electrically connected with the manufacture execution system;

a vehicle control system, electrically connected with the path planning system;

a plurality of vehicles, electrically connected with the vehicle control system, wherein each of the wafer cassette storage areas has a storage area detection device mounted therein, and each of the vehicles has a vehicle detection device mounted thereon, and the vehicle detection devices are used for detecting whether the storage area detection devices have faults; and an alarm system, electrically connected with the path planning system and the vehicle control system for recording a number of abnormal state occurrences of each vehicle and setting a maximum bearing number, wherein when the number of abnormal state occurrences of one of the vehicles reaches the maximum bearing number, the alarm system commands the path planning system to command the vehicle control system to drive the vehicle of which the number of abnormal state occurrences reaches the maximum bearing number to enter the maintenance area.

2. The automatic recovery and transport system as claimed in claim 1, further comprising a plurality of temporary platforms each of which has a platform detection device mounted thereon; and the vehicle detection devices used for detecting whether the platform detection devices have faults.

3. The automatic recovery and transport system as claimed in claim 1, wherein each of the vehicles has a rechargeable battery mounted thereon.

4. A method for executing an automatic recovery and transport system which is built in a wafer factory having a maintenance area and a plurality of wafer cassette storage areas each of which has a storage area detection device mounted therein includes a vehicle control system and a plurality of vehicles, each of the vehicles has a vehicle detection device mounted thereon, comprising the steps of:

(a). recording a number of abnormal state occurrences of each vehicle by an alarm system, and when the vehicle detection devices detect that any storage area detection device has a fault, the vehicle detection devices inform the alarm system that the storage area detection device has a fault via the vehicle control system, and the alarm system immediately sends an e-mail indicating the storage area detection device has a fault;

(b). setting a maximum bearing number corresponding to the number of abnormal state occurrences by the alarm system;

(c). the alarm system immediately sending a command to inform a path planning system when the number of abnormal state occurrences of any vehicle reaches the most bearing number, wherein the command contains that the vehicle of which the number of abnormal state occurrences reaches the most bearing number must be moved into the maintenance area for repair;

(d). the path planning system planning the shortest path along which the vehicle can move into the maintenance area and commanding the vehicle control system to drive the vehicle to move into the maintenance area along the planned path according to the command of the alarm system; and (e). the alarm system commanding the path planning system to command the vehicle control system to drive the vehicle to depart from the maintenance area when the vehicle is repaired to normal.

5. The method as claimed in claim 4, further comprising a plurality of temporary platforms each of which has a platform detection device mounted thereon; each of the vehicles having a vehicle detection device mounted thereon, wherein when the vehicle detection devices detect that any one of said platform detection devices has a fault, the vehicle detection device informs the alarm system that the platform detection device has a fault via the vehicle control system, and the alarm system immediately sends an email indicating that one of said platform detection devices has a fault.

6. The method as claimed in claim 4, wherein the abnormal states include signal transmission delay between each vehicle and the vehicle control system.

7. The method as claimed in claim 4, wherein each of the vehicles has a vehicle detection device mounted thereon and the abnormal states include that each vehicle detection device doesn't detect conditions in front of the corresponding vehicle.

8. The method as claimed in claim 4, wherein each of the vehicles has a vehicle detection device mounted thereon and the abnormal states include that each rechargeable battery cannot be charged.

* * * * *